United States Patent [19]
Norton et al.

[11] 4,074,330
[45] Feb. 14, 1978

[54] FLEXIBLE DISK STORAGE APPARATUS

[75] Inventors: David Gibbons Norton, Boulder; Gary Thorup Wright, Longmont, both of Colo.

[73] Assignee: International Business Machines Corporation, Armonk, N.Y.

[21] Appl. No.: 719,023

[22] Filed: Aug. 30, 1976

[51] Int. Cl.² .................. G11B 15/64; G11B 5/60; G11B 5/82

[52] U.S. Cl. .................. 360/102; 360/86; 360/99

[58] Field of Search .......... 360/99, 98, 105–106, 360/86, 135, 133, 102–103; 206/444

[56] References Cited

U.S. PATENT DOCUMENTS

| | | | |
|---|---|---|---|
| 3,178,719 | 4/1965 | Shapiro | 360/99 |
| 3,405,405 | 10/1968 | Boissevain et al. | 360/99 |
| 3,603,742 | 9/1971 | Schuller | 360/99 |
| 3,696,350 | 10/1972 | Cohen et al. | 360/99 |
| 3,731,292 | 5/1973 | Kelly | 360/98 |
| 3,947,886 | 3/1976 | Hiedecker et al. | 360/99 |
| 4,002,826 | 1/1977 | Iemenschot | 360/99 |
| 4,003,091 | 1/1977 | Wright | 360/99 |

FOREIGN PATENT DOCUMENTS

| | | | |
|---|---|---|---|
| 2,225,809 | 5/1971 | Germany | 360/99 |

*Primary Examiner*—Alfred H. Eddleman
*Attorney, Agent, or Firm*—Herbert F. Somermeyer

[57] ABSTRACT

A Bernoulli disk storage apparatus includes an elongated slot or groove having a substantial radial elongated portion for movably receiving a transducer. On either side of the groove are air bearing means which induce a pull down force on the record storage disk as it passes over the groove. By varying selected parameters, the medium-to-transducer spacing is held substantially constant throughout the radial extent of a desired recording area. Further, flutter usually associated with a Bernoulli disk at its outer radial portion is eliminated.

14 Claims, 7 Drawing Figures

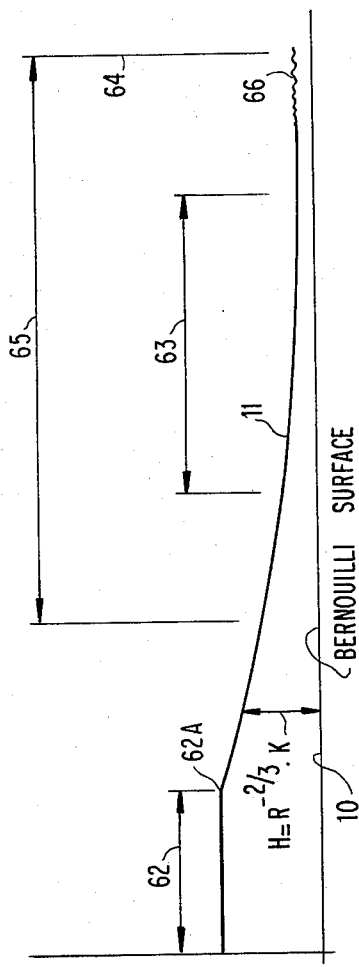
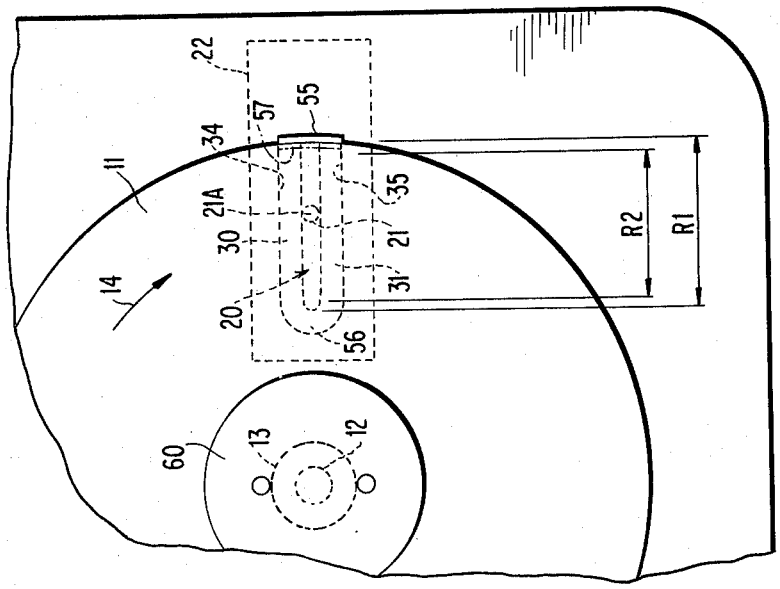

FLEXIBLE DISK STORAGE APPARATUS

DOCUMENTS INCORPORATED BY REFERENCE

The present invention is related in certain ways to the invention disclosed and claimed in copending application, Ser. No. 665,153, filed Mar. 8, 1976, and commonly assigned now U.S. Pat. No. 4,003,091.

BACKGROUND OF THE INVENTION

The present invention relates to disk type record storage apparatus, particularly to that apparatus which provides enhanced medium-to-transducer spacing and stabilization.

For successful magnetic recording, particularly at high densities, such as employed in storage apparatus for use with digital computers, data communication links and the like, there should be a predictable constant spacing between a record medium and a transducer over a wide range of operating parameters. Such spacing has a substantial effect, particularly at high densities, on the fringing flux pattern such that resolution of the sensing and recording on a record medium is significantly affected. Unfortunately, in flexible media record storage apparatus, the interaction of many parameters has a substantial effect on the predictability and maintainability of such desired constant spacing. Such parameters which effect the spacing include relative speed between the record medium and the transducer, contour of the surface areas surrounding the transducer, penetration of the transducer/stabilizer into the record medium (dimpling), radial position, as well as the disk storage substrate parameters, such as flexibility, thickness and so forth. Additionally, temperature and humidity can have a significant effect on variations of medium-to-transducer spacings.

For ensuring constant spacing between a record medium and a transducer, it is preferred that the transducer penetrate or dimple into the flexible record medium. In single disk storage apparatus of the Bernoulli type, such desired penetration at the outer radial portion of the single record disk may cause the Bernoulli effect to be destroyed. Further, such radial outward portions of Bernoulli stabilized record storage disks tend to flutter. This fluttering results in a variation of transducer spacing. Accordingly, the outer radial extent of the usable recording area is limited by such fluttering and adaptability of the record storage disk to accept penetration.

Such Bernoulli supported record storage disks are mounted on a spindle for rotation adjacent a backing plate usually referred to as a Bernoulli plate. It has been found that the spacing between the Bernoulli plate and the record storage disk, hence the spacing between the transducer and the record storage disk, varies as a function of disk radius. As one goes radially outwardly, the spacing of the record storage disk tends to become closer to the backing or Bernoulli plate. It was found that this spacing varies as the function of the disk radius raised to the minus two-thirds power. Accordingly, it is also desired to increase the radial extent of the recording area by reducing the disk to Bernoulli plate spacing adjacent the center of rotation while maintaining the Bernoulli effect throughout the radial extent of the record storage disk, at least in the area where the transducer is operatively associated with such record storage disks.

SUMMARY OF THE INVENTION

It is the object of the present invention to provide an improved Bernoulli type record storage apparatus with a tendency to have a more predictable and constant disk-to-transducer spacing over a wider range of operating parameters and which is relatively insensitive to radial position on the record disk.

In accordance with the invention, magnetic recording apparatus, particularly of the Bernoulli type include a rotatable flexible record storage disk disposed over a flat plate for achieving a Bernoulli stabilization of the flexible record storage disk. The flat plate has a radially elongated groove facing the flexible record storage disk. The transducer is movably disposed in the groove for radial movements to access various tracks of the flexible record storage disk. Bracketing the radial groove are up-stream and down-stream air bearing surfaces which are radially co-extensive with the groove. The flexible record storage disk moving over the air bearing surfaces and groove induce a pull down force on the record storage disk for keeping it in a stabilized constant spacing from a transducer in the groove. By radially extending the groove and the associated air bearings to the outer extremity of the record storage disk, substantially the entire radial outward portion of the record storage disk can be employed for recording.

In another aspect of the invention, at the radial outward portion of the groove, an end-plate seals the groove. It may have a shape facing the flexible record storage disk approximating the desired shape of the record storage disk as it moves over the transducer. In other aspects of the invention, the radius of curvature of the air bearing means are varied with disk radius for achieving a varying pull down force for yielding a constant spacing between the record storage disk and a transducer irrespective of disk radial position. Additionally, another variation is that the spacing between the groove bracketing air bearing surface means are reduced with increasing radius for additionally maintaining a more constant disk-to-transducer spacing with respect to radial variations.

THE DRAWING

FIG. 4 is a diagrammatic plan view of apparatus incorporating the invention and further including a contoured end-plate.

FIG. 5 is an enlarged diagrammatic end view with an enlarged vertical ordinate of the FIG. 4 illustrated apparatus showing the relationship between air bearing to the end-plate, record storage disk and a Bernoulli plate.

FIG. 6 is a graphical representation of the variation of fly-height between a record storage disk and its backing or stabilizing Bernoulli plate surface.

FIG. 7 is a partial plan diagrammatic view of an apparatus incorporating other aspects of the present invention.

DETAILED DESCRIPTION

Figure 1:
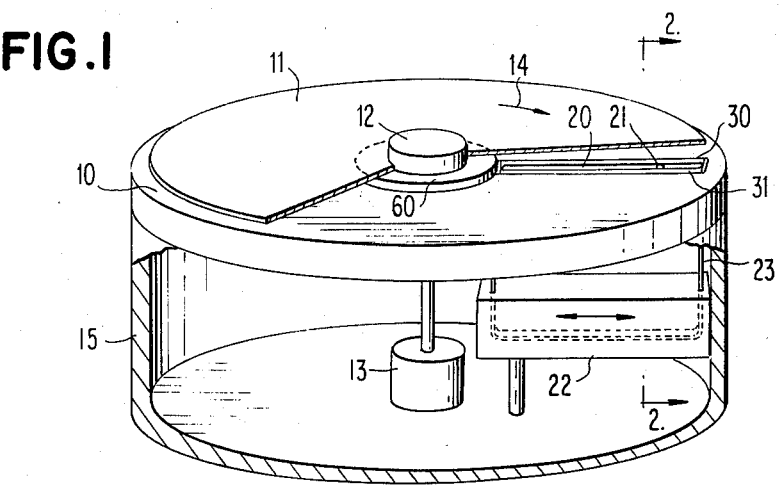
FIG. 1 is a simplified perspective view of one apparatus incorporating the teachings of the present invention.
Figure 2:
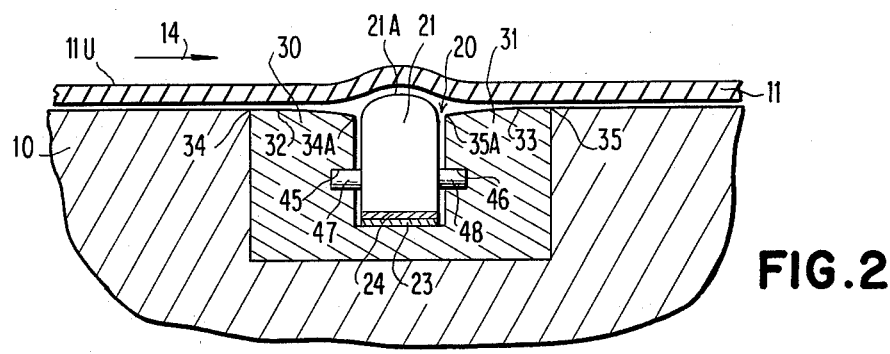
FIG. 2 is a diagrammatic enlarged partial sectional view taken along the line 2 — 2 in the direction of the arrows but with a greatly enlarged vertical ordinate for showing the transducer air bearing and record storage disk relationship of the FIG. 1 illustrated apparatus.

Referring now to the various figures, like numerals indicate like parts and structural features. Record storage apparatus incorporating the teachings of the invention includes a support or backing Bernoulli plate 10 disposed immediately adjacent to a flexible record storage disk 11. Record storage disk 11 is suitably secured to a center support spindle 12 for rotation by motor 13 in the direction of the arrow 14. Frame 15 suitably mounts Bernoulli plate 10 and motor 13. Bernoulli plate 10 includes a radially elongated slot 20 for movably receiving a transducer 21. A positioning apparatus 22 disposed on frame 15 immediately below Bernoulli plate 10 actuates transducer 21 for radial positioning movements. By way of example, a flexible stainless steel band 23 disposed along the bottom of groove 20 is connected to the positioning apparatus 22 and transducer 21 for radially positioning the transducer. Electrical connections are made via a flat electrical cable 24 disposed on the upper side of stainless steel band 23, as best seen in FIG. 2. Positioning apparatus 22 can be any type such as stepping motor, voice coil, or any other form of positioner. As best seen in FIG. 1, stainless steel band 23 extends from groove 20 downwardly to opposite ends of positioner 22. Positioner 22 includes a carriage (not shown), attached securely to band 23 as at 24 such that as the carriage (not shown) moves radially outwardly, transducer 21 moves radially inwardly, no limitation thereto intended.

Bracketing groove 20 are a pair of air bearing means 30 and 31. Air bearing means 30 is termed the upstream air bearing means as a particular point on record storge disk 11 will pass over air bearing means 30 prior to passing over transducer 21 and then over down-stream air bearing means 31. It is preferred that both air bearing means have a radius of curvature with an apex or high point of the surface of a disk 11 as at 32 and 33 respectively. Apexes 32, 33 are closer to the circumferential outer edges 34, 35 of the air bearing means than to the outer extremity of groove 20 (the inner circumferential edges 34A, 35A). With this arrangement, the pull down force on record storage disk 11 is maximized in that air carried by the storage disk 11 lower surface into groove 20 is limited by the relatively short surface area between 32 and 34; the air carried out of the groove is greater since the air bearing spacing between 35A and 33 is greater than the spacing between 34 and 32. The net result exhausts air from the groove 20 for generating a self-induced pull down force on disk 11 over groove 20. That is, on the down-stream air bearing surface, the long surface between groove 20 and apex 33 causes a major amount of air to be moved downwardly out of groove 20. As a result, groove 20 has an induced vacuum therein caused by the relative movement of record storage member 11 over the illustrated assemblage.

Figure 3:
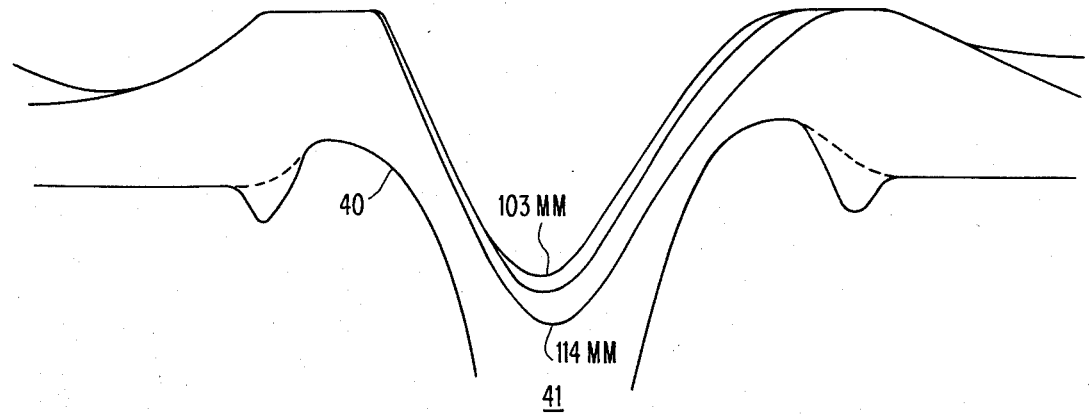
FIG. 3 is a graph illustrating the pull down force induced by the FIGS. 1 and 2 illustrated apparatus.

In the areas of groove 20 remote from transducer 21, the effect of such induced vacuum is illustrated in the graph of FIG. 3. The line 40 represents the disk facing surface of Bernoulli plate 10 together with the air bearing means 30, 31. The center of the graph as at 41 represents the force within groove 20, i.e., it is a negative force. The lines above line 40 represent spacings of a record storage disk 11 as it is transported across to groove 20 at various radii of record storage disk 11. Because of the flutter problem being addressed, only the outer-most radii are shown, it being understood that inner radii results in similar measurements. The radius 114 MM represents the outer extreme of the record storage disk. While 103 MM represents a radial position slightly inward of the outer circumference of the disk. Note that both positions result in a substantial dipping with a relatively constant spacing within groove 20.

The illustrated size of groove 20 accommodates movable magnetic transducer 21. For achieving the benefits of the present invention to establish a stable disk surface area for transducing operations, the size and shape of groove 20 is not pertinent; it must be sealed at both radial ends by end-plates 55 and 56 to prevent ambient air from entering the groove thereby destroying the pull down force. A transducer (not shown) can be positioned over the disk 11 to sense and record from the upper surface 110 as by a laser for optical records, and the like.

The record storage disk 11 in the immediate proximity to magnetic transducer 21 dimples out as best seen in FIG. 2. This dimpling is caused by the air bearing action of the transducer in combination with the action of the air bearing surfaces of 30 and 31. Accordingly, the dimple induced by transducer 21 is generally circular for a circular transducer resulting in a relatively positive pressure between the medium 11 and transducer 21, i.e., the pull down force exerted on the record storage member 11 tends to force the medium against the transducer irrespective of radial position. The air bearing action of transducer 21 contoured surface 21A keeps the medium 11 from contacting transducer 21 thereby eliminating wear on the medium 11 and transducer surface 21A.

To ensure a constant positioning of transducer 21 in groove 20, a pair of guide slots 45, 46 in plate 10 receive a pair of precision guide pins 47, 48, precisely affixed to transducer 21. Accordingly, as transducer 21 is moved radially in groove 20 by positioner 22, pins 47, 48 slide in slots 45, 46, ensuring that the height of transducer 21 with respect to the height of the apexes 32, 33, of the air bearing means 30, 31 is constant throughout the disk 11 radius.

The FIG. 3 graph was taken from data acquired from a Bernoulli disk apparatus wherein the air bearing means 30, 31 had a constant cross section, i.e., constant radius of curvature throughout the radial extents of the air bearing means. The air bearing means were spaced apart equally as best seen in FIG. 4. The slight disk-to-transducer variation shown in FIG. 3 with respect to disk 10 radius for many applications will not cause transducing difficulties. However, if a greater precision is desired, the radius of curvature of the air bearing means 30, 31 can be varied with the disk 10 radial position of the air bearing means. Generally, the larger the radius of the air bearing means the greater the pull down power. Referring to FIG. 2, this criterion means that when the radius of curvature of air bearing means 30, 31 at the outer circumferential edge is as shown, the radius of curvature at the inner disk 11 radius is greater. Remember, as shown in FIG. 6, the space between disk 11 and the Bernoulli plate 10 increases with a decrease in disk 11 radius according to the function $R^{-2/3}$ where R is disk 11 radius. This variation of radius of curvature in air bearing means 30, 31 with respect to the radial position on disk 11 can either be linear or non-linear in accordance with desires of the designer.

Referring again to FIG. 4, groove 20 has a radial extent R1 with the cap 21A of transducer 21 having a radial displacement R2. Accordingly, the recording band is R2. The greatest increase in recording area is at the outer radial extremity in that the addition of air bearing means 30, 31 reduce or remove the abovementioned flutter problem. The tests without transducer 21 in groove 20 resulted in the curves shown in FIG. 3 were operated with the apparatus shown in FIG. 2.

Pull down action on disk 11 is maintained by air sealing the outer peripheral end of groove 20. Any sealing means may be used. In one embodiment, contoured end-plate 55 at the outer extremity of air bearing means 30, 31, provided the air seal. As best seen in FIG. 5 which is an end-view looking at end-plate 55 as affixed to plate 10, it is seen that end-plate 55 upper surface facing disk 11 is contoured to the desired shape of disk 11 as it passes over the air bearing means 30, 31. This shape ignores the effect of the air bearing of transducer 21 on the pull down of disk 11. In one form of the invention, end-plate 55 may extend to within the outer circumference of disk 11 as represented by dashed line 57. It is preferred, however, that end-plate 55 be used for maximizing the utilization of record storage disk 11. An end-plate seal my be positioned radially outward of disk 11 and extend axially as indicated by dotted line 55C in FIG. 5. In such an arrangement, the peripheral edge of disk 11 should be close enough to end-plate 55 to make an air seal.

Referring to FIG. 6, the spacing H between the record storage disk 11 and the Bernoulli plate 10 is a function of the radius of the disk 11 raised to the minus two-thirds power. In a Bernoulli storage apparatus, the storage disk must be spaced a given distance above the Bernoulli surface in order to achieve the Bernoulli effect throughout the radial extent of the storage disk 11. To this end, a boss 60 on one end of shaft 12 supports disk 11 and spaces it an appropriate distance above the Bernoulli plate 10 as indicated in area 62 of FIG. 6. From the outer circumferential edge of boss 60 at 62A, disk 11 moves toward the Bernoulli surface as indicated in FIG. 6. In Bernoulli storage apparatus not using the present invention, typically would have a useful recording area indicated by the double headed arrow 63. By using the present invention, the recording area can be extended as indicated by dimensional line 64. By adjusting the pull down force with radius, the recording area can be further increased as indicated by the double headed arrow 65. Present invention removes the flutter indicated by wavy lines 66 at the radial outward portion of disk 11.

In addition to varying the radius of curvature of the air bearing means, the spacing between the air bearing means can be varied with disk 11 radius to achieve a similar result, such as seen in FIG. 7. Air bearing means 30A, 31A, each have a constant radius of curvature line and are aligned on tangent lines symmetrically about the line of radial movement of transducer 21. It has been found that varying the spacing between the air bearing means varies the pull down force. For example, at outer circumference of disk 11 air bearing means 30A, 31A are relatively close together for providing a minimal pull down force. This minimal force must be sufficient to overcome the penetration effect of transducer 21 on record medium 11. However, if the penetration is such that flutter will occur with this spacing between air bearing means 30A and 31A, the spacing can be increased as indicated by dashed lines 30B and 31B. At the same time, the contour in plate 55 should be circumferentially extended as indicated by the dashed lines 55A and 55B. In addition to the variations imposed upon the pull down force by the radially inwardly diverging air bearing means 30A and 31A, the effect can be further controlled by varying the radius of curvature, as above described. Accordingly, the invention teaches that constant spacing can be any desired spacing substantially independent of disk 11 radius by providing air bearing means which either can be constant throughout the radial extent of the transducing area, can be varied by varying the radius of curvature of the air bearing means, or the displacement between the air bearing means bracketing the transducing area or combinations thereof. While the invention has been illustrated with using a radially aligned transducer receiving groove 20, no limitation thereto is intended. Such groove may be on a tangent, may be arched or otherwise disposed on plate 10.

It is to be appreciated that the design and successful operation of signal storage apparatus employing the present invention is materially affected by a diversity of disk 11 and apparatus parameters. The intrinsic mechanical properties of disk 11, such as flexibility, temperature and humidity variations of flexibility and thickness coact with the air bearing means 30, 31 to give disk 11 an effective dynamic modulus of elasticity over groove 20. By increasing the circumferential spacing between apexes 32, 33 an effective downward lever action acts on disk 11. If Bernoulli plate 10 is under disk 11 then disk 11 tends to ride lower toward groove 20; other orientations of Bernoulli plate 10 would have other effects. Such lever action affects the modulus of elasticity of disk 11 over groove 20.

The interactions of the air bearings 30, 31, and disk 11 also are not simply evaluated. For example, when the apexes 32, 33 are parallel, as shown in FIGS. 2, 5; a decreasing radii of curvature in air bearing means 30, 31 with increasing plate 10 radius yields an apparent or dynamic diverging channel between the air bearing means 30, 31. That is, the pull down effect on disk 11 is similar to moving the air bearing means 30, 31 further apart as indicated by dashed lines 30B, 31B in FIG. 7.

Head or transducer 21 penetration into disk 11 also yields significant effects on stability. The same is true for penetration of air bearing means 30, 31 into disk 11, but with different effects, of course. Also, greater disk 11 radii results in less Bernoulli pressure, hence, different pull down forces may be required. Other variations include varying circumferential extents of the air bearing means with disk radius, i.e., the chordal length of the air bearing means varies. The apex 32, 33 heights can also be varied along with radius of curvature. These variations may have a substantial effect on disk penetration.

While the transducer 21 is shown movably disposed between air bearings 30, 31, no limitation thereto is intended. The head can be disposed within either air bearing, or an erase head could be in an air bearing (between the apexes 32, 33 inside the air bearings). It is important to note that the air bearings 30, 31 mechanically decouple flexible disk 11 in the area over groove 20 (inside the air bearings) from the disk 11 portion remote from the groove (outside air bearings 30, 31).

While the invention has been particularly shown and described with reference to preferred embodiments thereof, it will be understood by those skilled in the art that various changes in form and details may be made therein without departing from the spirit and scope of the invention.

What is claimed is:

1. Magnetic recording apparatus having a rotatable flexible circular record disk disposed over a flat plate, characterized in that:
   said flat plate has an elongated groove opening to said flexible record disk and having a substantial radial length;
   a transducer movably disposed for radial displacements along said groove for transducing operations with respect to said flexible record disk and substantially closed to axial air flow and to radial air flow at each radial extremity thereof and extending to be juxtaposed to a circumferential edge of said flexible record disk; and
   pull down means having up-stream and down-stream air bearing means extending from said flat plate toward said flexible record storage disk and being respectively disposed along said groove on opposite sides thereof for inducing a pull down force on said flexible record disk toward said transducer, each said air bearing means having a radially elongated convex surface raised from said flat plate toward said record disk each with a radially extending apex such that the circumferential extent of both air bearing means is greater between the apexes adjacent said groove than remote from said groove whereby disk motion over said air bearing means tends to remove air from said groove to generate a pull down action on said disk over said groove and between said apexes independent of transducer radial position.

2. Magnetic recording apparatus set forth in claim 1 wherein said pull down means further include means varying with respect to radius of said flexible record disk for varying the pull down force with radius whereby a more constant spacing is achieved between said flexible record disk and said transducer.

3. The magnetic recording apparatus set forth in claim 2 wherein each said up-stream and down-stream air bearing means have a given radius of curvature varying with radius of said disk whereby the pull down force exerted on said disk varies with disk radius.

4. The magnetic recording apparatus set forth in claim 2 wherein the effective circumferential spacing between said up-stream and down-stream air bearing means varies with disk radius whereby the pull down force on said disk varies with said disk radius.

5. The magnetic recording apparatus set forth in claim 4 wherein said air bearing means spacing with respect to said groove vary symmetrically by a radial line disecting said groove.

6. Magnetic recording apparatus set forth in claim 1 further including an end-plate closing said groove at an outer circumference of said record storage disk and said end-plate having an upper contour facing said record storage disk corresponding to a given desired contour of said disk as it passes over said pull down means.

7. The magnetic recording apparatus set forth in claim 1 wherein said groove is open only to facing said recording storage disk and having a length such that said disk completely closes said groove.

8. Magnetic recording apparatus having a rotatable flexible record disk disposed over a flat Bernoulli plate having a flat surface facing said record disk, characterized in that:
   a transducer supporting block extending radially on said flat plate and extending toward said record disk therefrom and having an elongated radially extending groove therein for movably receiving a transducer;
   a transducer movably mounted in said groove;
   said block having walls substantially perpendicular to said flat plate and extending toward said facing surface; and
   said block further including air bearing surface means extending radially coextensively with said groove and having a given radius of curvature such that an apex of said radius of curvature with respect with said flat plate occurs closer circumferentially to said vertical walls than to said groove.

9. Magnetic recording apparatus set forth in claim 8 wherein said contoured surface and said block exhibit predetermined parameters for altering the pull down force on said disk with respect to the radius of said disk whereby the pull down force on said disk results in a substantial constant axial displacement of said disk irrespective of radius of said disk.

10. The magnetic recording apparatus set forth in claim 8, further including an end-plate portion in said block having a contour facing said record storage disk approximating the desired pull down displacement of said disk as it passes over said block.

11. A Bernoulli plate for use in a record storage apparatus and having a flat surface for facing a flexible record storage disk, characterized in that:
   said plate has a circular portion coaxial with a desired axis of rotation of a flexible record storage disk;
   said circular portion having a radially elongated disk stabilizing pull down means extending at least coextensively with a radial extent of a desired recording area on a record storage disk to be used in said apparatus; and
   said pull down means comprising a pair of circumferentially adjacent air bearing means, each said air bearing means having an air bearing apex and first and second air bearing surfaces, each said first surfaces being intermediate said apexes of said closely spaced air bearing means, said second surfaces being outside said closely spaced apexes and said first surfaces having a greater circumferential extent than said second surfaces.

12. A record storage apparatus including the Bernoulli plate set forth in claim 11, further including in combination:
   a transducer in juxtaposition to said Bernoulli plate for transducing operations with a record storage disk facing said Bernoulli plate; and
   means for radially moving and orienting said transducer for transducing operations intermediate said apexes inside said pull down means.

13. The storage apparatus set forth in claim 12, wherein said Bernoulli plate includes a radial groove inside said pull down means extending radially to a radial outer extremity of said record storage disk; and
   said transducer being radially movably mounted in said groove.

14. The record storage apparatus set forth in claim 13, wherein said transducer is a magnetic transducer.

* * * * *